US011518270B2

United States Patent
Heyne et al.

(10) Patent No.: US 11,518,270 B2
(45) Date of Patent: Dec. 6, 2022

(54) METHOD FOR CHARGING A TRACTION BATTERY OF A MOTOR VEHICLE

(71) Applicant: Dr. Ing. h.c. F. Porsche Aktiengesellschaft, Stuttgart (DE)

(72) Inventors: Raoul Heyne, Wiernsheim (DE); Timo Kaul, Bietigheim-Bissingen (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 0 days.

(21) Appl. No.: 17/392,329

(22) Filed: Aug. 3, 2021

(65) Prior Publication Data

US 2022/0032815 A1 Feb. 3, 2022

(30) Foreign Application Priority Data

Aug. 3, 2020 (DE) ...................... 10 2020 120 382.9

(51) Int. Cl.
*B60L 58/18* (2019.01)
*B60L 53/10* (2019.01)
(Continued)

(52) U.S. Cl.
CPC ............... *B60L 58/18* (2019.02); *B60L 53/11* (2019.02); *B60L 53/62* (2019.02); *H02J 7/0013* (2013.01);
(Continued)

(58) Field of Classification Search
None
See application file for complete search history.

(56) References Cited

U.S. PATENT DOCUMENTS 10,675,991 B2 6/2020 Hu et al.
2019/0016225 A1* 1/2019 Zies ................... H05K 7/20927
(Continued)

FOREIGN PATENT DOCUMENTS

| DE | 10 2018 000 490 | 7/2018 |
| DE | 10 2019 111 407 | 11/2019 |
| DE | 10 2019 007 868 | 7/2020 |

OTHER PUBLICATIONS

German Examination Report dated Apr. 15, 2021.

*Primary Examiner* — Jared Fureman
*Assistant Examiner* — Aqeel H Bukhari
(74) *Attorney, Agent, or Firm* — Gerald E. Hespos; Michael J. Porco

(57) ABSTRACT

A method charges a traction battery (42) with a stationary charging column (20). The method includes registering a charging process by the vehicle charging controller (50) to the charging column charging controller (22) with a low voltage value (U1) as a requested charging voltage (UR). The method then controls an insulation test carried out by the charging-column-side insulation tester (26). The method reports the maximum charging column voltage (UL) to the vehicle charging controller (50), and if the reported maximum charging column voltage (UL) corresponds to a high voltage value (U2) higher than the low voltage value (U1): registering a charging process by the vehicle charging controller (50) to the charging column charging controller (22) with the high voltage value (U2) as a requested charging voltage (UR) and setting the charging voltage adapter (44) to a charging voltage (UL) corresponding to the high voltage value (U2).

3 Claims, 1 Drawing Sheet

(51) Int. Cl.
  *B60L 53/62* (2019.01)
  *H02J 7/00* (2006.01)
(52) U.S. Cl.
  CPC ....... *B60L 2210/10* (2013.01); *B60L 2210/20* (2013.01); *B60L 2240/527* (2013.01); *B60L 2240/547* (2013.01)

(56) References Cited

U.S. PATENT DOCUMENTS

| | | |
|---|---|---|
| 2019/0070971 A1 | 3/2019 | Kusumi et al. |
| 2020/0185936 A1 | 6/2020 | Oishi et al. |
| 2020/0223319 A1* | 7/2020 | Uhlenbrock .......... B60L 53/305 |

* cited by examiner

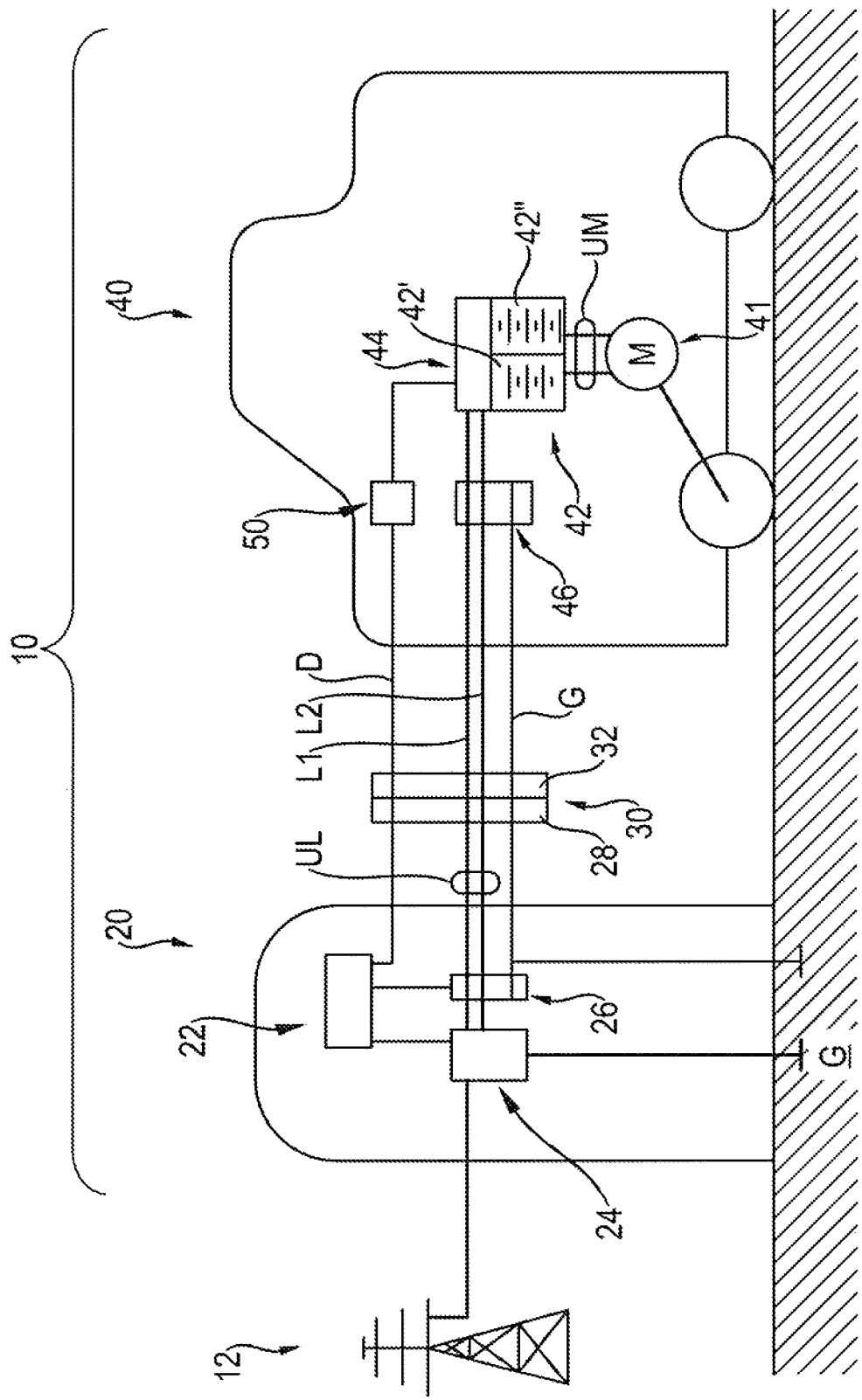

METHOD FOR CHARGING A TRACTION BATTERY OF A MOTOR VEHICLE

CROSS REFERENCE TO RELATED APPLICATION

This application claims priority under 35 USC 119 to German Patent Appl. No. 10 2020 120 382.9 filed on Aug. 3, 2020, the entire disclosure of which is incorporated herein by reference.

BACKGROUND

Field of the Invention

The invention relates to a method for charging a traction battery of a motor vehicle having an electric traction motor.

Related Art

High-voltage traction batteries of motor vehicles driven supplementarily or exclusively by an electric motor have different technical DC charging voltage levels (e. g. 400 V or 800 V) depending on manufacturer and model. Traction batteries that have a technical charging voltage level with a high voltage value (e. g. 800 V) are used in vehicles with a high drive power, and the shortest possible time for charging the traction battery is sought for these vehicles. In contrast, many high-voltage charging columns offer a lower voltage value of, for example, nominally 400 V as the maximum charging column voltage, for example charging columns in China. Communication protocols define the communication between the charging column charging controller and the vehicle charging controller, and existing communication protocols complicate or preclude initiation of a charging process of a motor vehicle with a high technical traction battery charging voltage level of, for example, 800 V at a charging column with a lower maximum charging column voltage of, for example, 400 V.

After the electrical connection of the vehicle-side charging plug, which can also subsequently be referred to as a charging socket, to the charging-column-side charging plug, the motor vehicle registers itself by its charging controller at the charging controller of the charging column with the nominal voltage value of the traction battery charging voltage level. When the traction battery charging voltage level is above the nominal maximum charging column voltage, the charging column charging controller categorically rejects a charging process according to the existing communication protocols. This means that the network of charging columns for charging a traction battery with a high charging voltage level of for example 800 V may be very wide-meshed.

It is the object of the invention to provide a method for charging a motor vehicle traction battery with a (higher) technical charging voltage level that also permits charging with its technically settable lower charging voltage at charging columns with a lower maximum charging column voltage.

SUMMARY

The invention is described herein using the example of a motor vehicle with a technical charging voltage level of the traction battery of 800 V and a charging column with a maximum charging column voltage of either 400 V or 800 V. All of these voltage values are purely examples. In any case, the traction battery is a so-called high-voltage traction battery with a technical charging voltage level of much more than 60 V. In the present case, the technical charging voltage level of the traction battery is always understood as a maximum voltage value with which the traction battery can be charged by a charging column to thus keep the charging time as short as possible. The technical charging voltage level can be the level with which the electric traction motor of the motor vehicle is fed. In the present case, a charging column is to be understood not as a column in the spatial sense but is to be understood as a stationary charging terminal for charging the motor vehicle traction battery that forms the charging interface to the motor vehicle.

The charging column has a charging column charging controller for monitoring and controlling the charging process. To generate a high-voltage DC charging voltage, the charging column has a charging voltage converter that generates from the supplied AC voltage of a supply network a lower charging column voltage, which is a DC voltage of for example 400 V, which with respect to the technical charging voltage level of the traction battery of the motor vehicle in the configuration considered for the invention.

The charging column has an insulation tester for testing the insulation of the charging lines with respect to the ground potential. Before the initiation of a charging process, the insulation tester of the charging column tests the electrical insulation or the electrical resistance of the two DC voltage charging lines, by means of which the electrical charging energy flows from the charging column to the motor vehicle traction battery, with respect to the electrical ground potential. The charging column finally has a charging plug that can be mechanically and electrically connected to a corresponding or complementary charging plug of the vehicle to connect the respective charging lines electrically to one another. In the present case, a charging plug is not intended to be understood as a specific shape but rather is to be understood as an arrangement that is designed to be able to be mechanically and electrically plugged together with another plug.

The motor vehicle has its own vehicle charging controller for monitoring and controlling the charging process. The motor vehicle also has its own separate insulation tester for testing the electrical insulation of the motor vehicle charging lines with respect to the electrical ground potential by means of the grounding of the charging column.

The motor vehicle has an electrical traction battery with a technical charging voltage level with a relatively high voltage value of for example 800 V. As a result, very rapid charging of the traction battery is possible at charging columns with a maximum charging column voltage of for example nominally 800 V. The traction motor can also effectively be supplied with electrical energy with the high voltage value of the technical charging voltage level. The heat losses can be kept relatively low by way of a high technical charging voltage level of the motor vehicle traction battery.

The motor vehicle has a vehicle-side charging plug that can be connected to the corresponding charging column charging plug. In this case, two charging lines, a ground potential line and generally also at least one data line, are connected electrically to one another. In principle, data can also be transmitted wirelessly between the charging column charging controller and the vehicle-side charging controller.

The motor vehicle has a charging voltage adapter, by way of which, when required, a low charging column voltage of for example 400 V can be adapted to the technical traction battery charging voltage level of for example 800 V by stepping up. Two 400 V modules of the traction battery can also be connected electrically in parallel during charging when required, for example, by the charging voltage adapter, whereas they are connected electrically in series during driving operation. In this way, the traction battery can be charged selectively with a charging column voltage of 400 V and also 800 V. The charging voltage adapter is controlled by the vehicle charging controller.

In accordance with the invention, the following method steps are provided when the charging plugs are connected to one another:

First, the vehicle charging controller registers to the charging column charging controller a charging process or a charging process desire with a lower desired charging voltage value of for example 400 V. The registration at a charging column always takes place with the lower desired charging voltage value of for example 400 V to ensure that the charging desire is also accepted by a charging column with a lower maximum charging column voltage of example 400 V.

A charging column with a low maximum charging column voltage of for example 400 V does not reject the registered charging desire but accepts it. Subsequently, the preparation of the charging process is carried out by the charging column charging controller and the vehicle charging controller so that ultimately the charging process is started and carried out with a low maximum charging voltage of 400 V. In this way, it is possible for a motor vehicle having a traction battery with a relatively high technical charging voltage level to be charged at a charging column with a lower maximum charging column voltage.

When the motor vehicle with a high technical traction battery charging voltage level of for example 800 V registers itself with the low voltage value of for example 400 V as requested charging voltage at a charging column, which may provide a higher maximum charging column voltage of for example 800 V, the charging controller of the charging column first prompts and controls an insulation test by way of the charging-column-side insulation tester for the charging voltage of 400 V requested on the vehicle side, since this is thus provided in the existing charging protocols and charging procedures.

Only when the insulation test for 400 V has been passed successfully does the charging column controller report the available maximum charging column voltage to the vehicle charging controller according to the applicable communication protocols. Only now does the vehicle charging controller discover—according to applicable communication protocols—what maximum charging column voltage the charging column can provide.

If the reported maximum charging column voltage is above the low voltage value initially reported by the vehicle charging controller as requested charging voltage, there is then a continuation or another registration of a charging process by way of the vehicle charging controller to the charging column charging controller with the high voltage value or with the maximum charging column voltage value previously reported by the charging column when this is technically useful for charging. If the charging column charging controller accepts the registration of the higher requested charging voltage, the charging voltage adapter is adapted to the charging voltage corresponding to the high voltage value by virtue of for example each of two 400 V modules of the traction battery being connected in series.

Furthermore, for this case, the vehicle charging controller prompts the vehicle-side insulation tester to carry out an insulation test according to standard for the now agreed high charging voltage of for example 800 V, and specifically preferably even before the electrical charging process is actually started. This ensures that the required electrical insulation of the charging lines with respect to the ground potential also is ensured for the higher voltage value, even though the charging-column-side insulation tester had initially carried out only an insulation test for a low voltage value of for example 400 V. This procedure ensures a sufficient insulation safety and is compliant with rules.

If the maximum charging column voltage reported by the charging column charging controller to the vehicle-side vehicle charging controller corresponds to the low voltage value that the vehicle charging controller had also initially requested, the vehicle-side charging voltage adapter is adapted or switched to the low voltage value of for example 400 V if this was not yet the case from the offset.

The method according to the invention achieves a situation in which a high-voltage traction battery with a nominally higher technical charging voltage level can also be accepted and charged by a charging column with a lower maximum DC voltage charging column voltage.

An exemplary embodiment of the invention is explained in more detail in the following text with reference to the drawing. The FIGURE schematically shows a motor vehicle charging arrangement having a motor vehicle having an electric traction battery, which is charged by a charging column.

DETAILED DESCRIPTION

The FIGURE shows a motor vehicle charging arrangement 10 that is formed substantially by a stationary charging column 20 and a motor vehicle 40 that has an electric traction motor 41 and an electric traction battery 42 that feeds electrical drive energy to the electric traction motor 41.

The traction battery 42 is a high-voltage traction battery with a technical charging voltage level UM of 800 V, and has, for example, two two identical traction battery modules 42', 42" of 400 V each. The traction battery 42 has an associated charging voltage adapter 44 that can electrically interconnect the traction battery modules 42', 42" in parallel or in series so that the traction battery 42 can be charged alternatively both with a charging voltage of 400 V when the voltage adapter 44 electrically connects the two modules 42', 42" in parallel or can be charged with 800 V charging voltage when the charging voltage adapter 44 electrically connects the two traction battery modules 42', 42" in series. The charging voltage adapter can alternatively step up the charging voltage fed in from 400 V to 800 V.

The motor vehicle 40 has an insulation tester 46 that can test the two charging lines L1, L2 that run from a vehicle-side charging plug 32 to the charging voltage adapter 44, in each case for sufficient electrical insulation with respect to the electrical ground potential G at a test voltage. In a first step, the test voltage corresponds to a charging voltage initially requested by the vehicle charging controller 50, that is to say in the present case corresponds to a low voltage value U1 of for example 400 V.

The motor vehicle 40 also has a vehicle charging controller 50 that controls the entire charging process on the vehicle side and for this purpose communicates with a corresponding charging-column-side charging controller 22.

The charging column 22 is supplied with electrical energy by a high-voltage supply network 12 with the electrical energy being fed in in the form of a high-voltage AC voltage in a charging voltage converter 24 of the charging column 20. The charging voltage converter 24 is connected electrically to the ground potential by means of a corresponding grounding line and in the present case converts the AC voltage fed in to a high charging column voltage UL with a high voltage value U2 of nominally 800 V DC. However, there are also charging columns that convert a low charging column voltage UL with a low voltage value U1 of for example nominally 400 V. Stored in the vehicle charging controller 50 is a charging controller program that permits charging of the traction battery 42 both by way of a charging column with a maximum charging column voltage with a high voltage value U2 of 800 V and with a low voltage value U1 of 400 V.

The charging column 20 has its own separate insulation tester 26 that tests the electrical insulation or the electrical resistance of the two charging lines L1, L2 with respect to the ground potential G as soon as this is demanded by the charging column charging controller 22. The charging column 20 has an electrically associated charging column charging plug 28 that can be connected electrically to the vehicle charging plug 32 to form a charging plug arrangement 30. As a result, each of the charging lines L1, L2 electrically connects at least one data line D and a separate grounding line.

The method according to the invention is described initially using the example of a charging column with a maximum charging column voltage UL with a high voltage value U2 of 800 V.

After the two charging plugs 28, 32 have been plugged together, the vehicle charging controller 50 registers to the charging column charging controller 22 a charging process with a low voltage value U1 of for example 400 V as requested charging voltage UR. This registration is accepted by the charging column charging controller 22. Thus, the controller asks the charging control insulation tester 26 to carry out an insulation test for the requested charging voltage of 400 V. In this case, the two charging lines L1, L2 coming from the charging voltage converter 24 are tested for their insulation resistance with respect to the ground potential G. If the insulation resistance is sufficient, that is to say the insulation test is positive, the charging column charging controller 22 reports the maximum charging column voltage UL in the amount of the high voltage value U2 of 800 V to the vehicle charging controller 50. Since the traction battery 42 has a technical charging voltage level UM with a high voltage value of 800 V, the vehicle charging controller 50 subsequently again reports a requested charging voltage UR in the amount of the high voltage value U2 of 800 V.

When the charging column charging controller 22 finally accepts the now requested charging voltage UR of the high voltage value U2 of 800 V, the vehicle charging controller 50 instructs the charging voltage adapter 44 to be set to a charging voltage UL corresponding to the high voltage value U2 of 800 V or to switch over thereto. The charging voltage adapter 44 simply is disconnected accordingly so that the vehicle battery can be charged directly or it electrically connects for example the two traction battery cells 42', 42" in series for this purpose. At the same time, the vehicle charging controller 50 prompts the vehicle-side insulation tester 46 to carry out an insulation test with the high voltage value U2 of 800 V and to continuously repeat this throughout the entire subsequent charging process. This ensures the conformity with the legal requirements with respect to safety and in particular insulation safety.

When the vehicle charging controller 50 registers to a charging column 20 with a maximum charging voltage UL with a low voltage value U1 of 400 V, for example, the charging voltage adapter 44 is set to a charging voltage UL corresponding to the low voltage value U1 at the latest shortly before the start of the actual charging operation, for example by virtue of the two traction battery modules 42', 42" being electrically connected in parallel during the charging operation.

What is claimed is:

1. A method for charging a traction battery of a motor vehicle having an electric traction motor by way of a stationary charging column,
   wherein the charging column has:
      a charging column charging controller for monitoring and controlling the charging process, a charging voltage converter for providing a DC charging column voltage fed in in charging lines, an insulation tester for testing the electrical insulation of the charging lines with respect to the ground potential and a charging-column-side charging plug, wherein the charging voltage converter provides a fixed maximum charging column voltage for charging the traction battery that may be a low voltage value or a high voltage value, and
   wherein the motor vehicle has:
      a vehicle charging controller for monitoring and controlling the charging process, an insulation tester for testing the electrical insulation of the charging lines with respect to the ground potential, a vehicle-side charging plug and a charging voltage adapter, by way of which the charging column voltage is adapted to the technical charging voltage level of the traction battery when needed, wherein the traction battery has a technical charging voltage level with the high voltage value,
   having the following method steps when the charging plugs are connected: registering a charging process by way of the vehicle charging controller to the charging column charging controller with the low voltage value as requested charging voltage,
   controlling an insulation test, carried out by way of the charging-column-side insulation tester, by way of the charging column charging controller for the requested charging voltage,
   reporting the maximum charging column voltage by way of the charging column controller to the vehicle charging controller, and
   if the reported maximum charging column voltage corresponds to the high voltage value: continuing or registering a charging process by way of the vehicle charging controller to the charging column charging controller with the high voltage value as requested charging voltage and setting the charging voltage adapter to a charging column voltage corresponding to the high voltage value.

2. The method for charging a traction battery of a motor vehicle of claim 1, further comprising the following method step after the maximum charging column voltage has been reported to the vehicle charging controller:
   if the reported maximum charging column voltage corresponds to the low voltage value: setting the charging voltage adapter to a charging column voltage corresponding to the low voltage value.

3. The method for charging a traction battery of a motor vehicle of claim 1, further comprising:
   if the charging voltage adapter has been set to a charging column voltage corresponding to the high voltage value: controlling an insulation test, carried out by way of the vehicle-side insulation tester, by way of the vehicle-side charging controller with the high voltage value.

\* \* \* \* \*